P. EBELING.
MANUFACTURE OF GLASS TOPS FOR SALT SHAKERS, &c.
APPLICATION FILED NOV. 7, 1907.
902,865.
Patented Nov. 3, 1908.
2 SHEETS—SHEET 1.
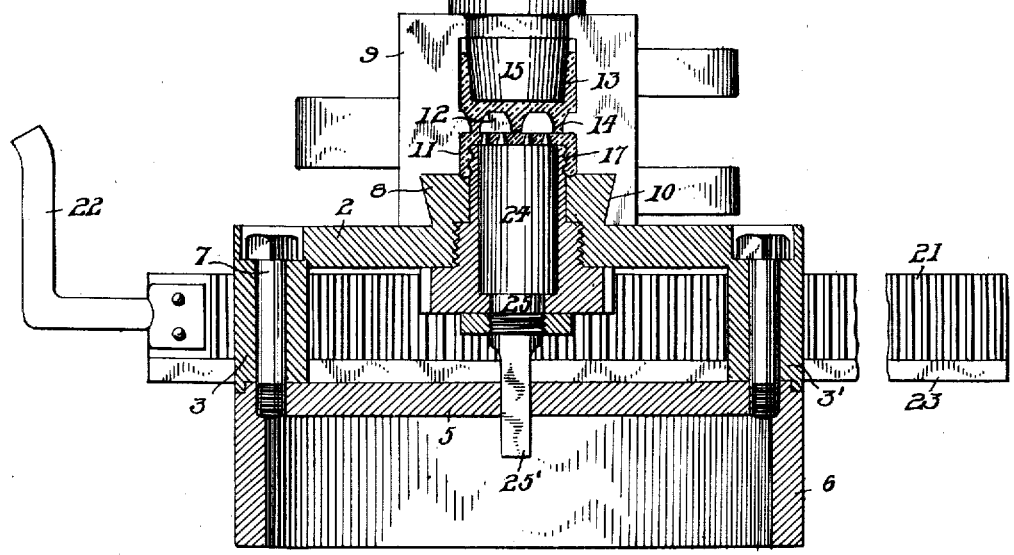

P. EBELING.
MANUFACTURE OF GLASS TOPS FOR SALT SHAKERS, &c.
APPLICATION FILED NOV. 7, 1907.
902,865.
Patented Nov. 3, 1908.
2 SHEETS—SHEET 2.
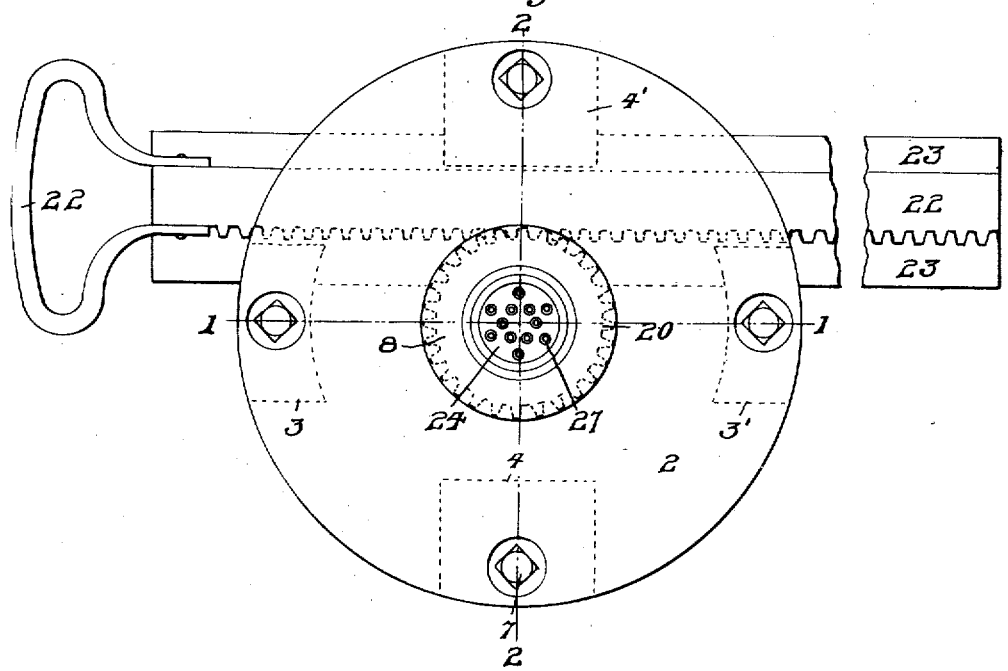
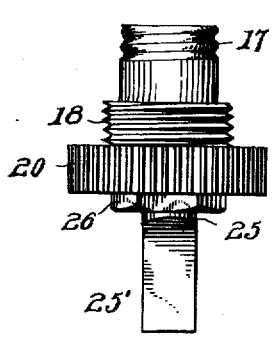
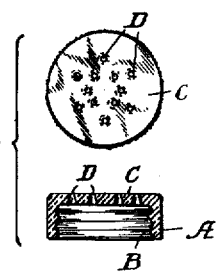

UNITED STATES PATENT OFFICE.

PHILLIP EBELING, OF MOUNDSVILLE, WEST VIRGINIA, ASSIGNOR TO FOSTORIA GLASS COMPANY, OF MOUNDSVILLE, WEST VIRGINIA, A CORPORATION OF WEST VIRGINIA.

MANUFACTURE OF GLASS TOPS FOR SALT-SHAKERS, &c.

No. 902,865.  Specification of Letters Patent.  Patented Nov. 3, 1908.

Application filed November 7, 1907. Serial No. 401,061.

*To all whom it may concern:*

Be it known that I, PHILLIP EBELING, a resident of Moundsville, in the county of Marshall and State of West Virginia, have invented certain new and useful Improvements in the Manufacture of Glass Tops for Salt-Shakers, &c., of which the following is a specification.

This invention relates to the manufacture of perforated glass tops or covers for salt and other condiment holders, and the primary object is to provide for molding the cap-like cover with internal threads for engaging the threads of the cellar body, and at the same time form the perforations in the cover through which the salt or other material is shaken.

A further object is to provide the cover with outwardly tapering perforations so that by grinding off the outer face, perforations varying in size are secured as required for salt, pepper, etc.

To produce these flanged, threaded and perforated glass covers, it is necessary to provide within the molding cavity a core-like thread-forming member which is retracted by a rotary receding or unscrewing movement for detaching it from the molded cover. And it is further necessary to avoid rotation of the hole-formers or pins. With these requirements in view, I have designed improved apparatus for practicing the invention, for which novelty is claimed as well as for the method of manufacture.

In the accompanying drawings Figure 1 is a vertical sectional view of the molding apparatus, taken on line 1—1 of Fig. 3, showing the mold closed, and Fig. 2 is a section taken at right angles to Fig. 1, or on line 2—2 of Fig. 3, showing the mold open. Fig. 3 is a top plan view of the mold base and the mechanism therebetween, the sectional mold being removed. Fig. 4 is a detail view of the internal thread-forming member. Fig. 5 illustrates one of the molded covers.

Referring to the drawings, 2 designates the mold base having on its under side the opposite pairs of lugs 3, 3' and 4, 4', which space base 2 upwardly from bottom plate 5. Supporting rim 6 depends from the latter, and the parts are secured together by bolts 7.

Projecting upwardly centrally from base 2 is the frusto-conical extension 8, around which sections 9 of the mold close, the latter being recessed at 10 to accurately embrace extension 8 with the latter forming the bottom of the molding cavity, or that part of the cavity against which the edge of rim A of the glass top is molded. The sectional mold is recessed to form the molding cavity 11 immediately above the base extension 8, the top of this cavity consisting of the partition 12 which separates it from the plunger cavity 13, the partition having passages 14 through which the molten glass is forced into the molding cavity upon the lowering of the plunger 15.

Base 2 and extension 8 are formed with the vertical passage 16, and extending therethrough is the annular hollow thread-forming member, having its upper portion 17 projecting into the molding cavity and threaded on its exterior to mold the internal threads B on flange A of the molded top. The hollow former is threaded exteriorly between its ends at 18 to engage threads 19 of passage 16, whereby when the hollow former is rotated in one direction it is raised into molding position, and when turned in the opposite direction is lowered and retracted from the molded article. For rotating the hollow former its lower end 20 is of gear-wheel form and meshes with the sliding rack bar 21, having at one end handle 22. The rack bar is flanged longitudinally at 23 to move within undercuts in base flange 3, 3' and 4' which form a guideway. Movement of the rack bar in one direction operates to raise the hollow former into molding position, while a reverse movement rotates and lowers the former, causing its threaded upper extremity 17 to be withdrawn from the molded article without impairing the threads molded therein.

Top C of the cover is provided with a number of upwardly or outwardly tapering openings D through which the salt, pepper, etc. is shaken, and to form these openings, a circular plug-like carrier 24 is arranged within the hollow former and is provided with the depending stem 25 which projects through the lower end of the former and carries nut 26 which causes the carrier 24 to raise and lower with the hollow former. But while thus raising and lowering, the carrier is prevented from rotating by the engagement of flattened extremity 25' with a similarly formed passage in base plate 5.

Carrier 24 preferably rises to the same height as the thread-molding upper extremity 17 of the hollow former, and projecting from its upper face are the upwardly extending pins or projections 27 which when raised, as in Fig. 1, are in close proximity to partition 12 which defines the top of molding cavity 11.

At the beginning of the operation the mold is closed around base projection 8 and the forming members raised as in Fig. 1. A proper quota of molten glass is placed in plunger cavity 13, and upon lowering the plunger the glass is forced downward through passages 14 and completely fills the molding cavity, the glass filling in around the thread former 17 and pins 27, as will be understood. The surplus glass remains in the plunger cavity and may be readily removed together with the sprues in passages 14 when the mold sections are opened to remove the pressed article, as in Fig. 2. By this means exactly the same amount of glass is forced into the molding cavity at each operation, or in other words the cavity is always completely filled, there being no variation in the amount of glass such as occurs when the plunger enters directly into the molding cavity. Upon completion of the pressing operation, rack-bar 21 is reciprocated as above described for at once rotating and lowering the thread molding member from the molded article, as shown in Fig. 2. The same movement lowers the pin carrier 24 and withdraws pins 27 from holes C which they have molded in top portion D of the cover, the carrier being prevented from rotating while thus lowering in the manner above described.

Pins 27 are preferably tapered upwardly in order to form holes of corresponding shape in top D. In finishing the molded covers it is necessary to grind the top surface, and with the holes tapered, the surface may be ground off more or less according to the size of openings desired, those for salt shakers being of course larger and requiring more grinding than for pepper, etc.

I claim:—

1. The combination of a mold having a molding cavity, and a thread former and hole formers movable into and out of the cavity, said parts moving in like direction when being inserted and in like direction when being withdrawn.

2. The combination of a mold having a cover molding cavity, a thread former movable into the cavity and around which the cover is molded, and hole formers movable in the same portion of the molding cavity as the thread former.

3. The combination of a mold having a cover-molding cavity, a tubular rotatable thread-former projected into the cavity, a longitudinally movable non-rotating carrier within the tubular thread-former, and hole formers on the carrier and projected thereby into the molding cavity.

4. The combination of a mold having a cover molding cavity, a hollow former projecting into the cavity and having external threads exposed within the cavity, a pin carrier movable through the hollow former, hole forming pins projecting through the carrier into said cavity, and means for retracting the carrier and the hollow former.

5. The combination of a mold having a molding cavity open from below, a hollow former fitting such opening and adapted to project into the molding cavity with the projecting portion threaded exteriorly, supporting means with which the former has threaded connection, former-rotating means operating to raise and lower the former, a non-rotating pin carrier within the hollow former and adapted to rise and lower therewith, and hole forming pins projecting from the carrier above the threaded portion of the thread former.

6. The combination of a mold having a cover-molding cavity open from below, a rotatable hollow former projecting upwardly into the cavity with threads on the exterior thereof, a support for the hollow former with which the latter has threaded connection and means for rotating the former for projecting it into the molding cavity and for withdrawing it therefrom, a non-rotating carrier upon which the threaded former turns, means for causing the carrier to move inward and outward with the hollow former without interfering with the rotation of the latter, and hole forming pins projecting from the carrier into the molding cavity.

7. The combination of a mold base, mold sections adapted to close thereover and recessed to form a mold cavity immediately above the base, the mold base having an annular vertical passage opening into the molding cavity and spaced inwardly from the walls of the latter, the space between said passage and the walls corresponding to the thickness of the rim of the molded article, a hollow former fitting the passage and projecting into the molding cavity with the projecting portion threaded externally, means for simultaneously rotating and lowering the hollow former in said passage, a non-rotating pin carrier fitting within the hollow former and around which the latter rotates, means for moving the pin carrier vertically with the former, and hole-forming pins projecting from the carrier above the threaded upper portion of the former.

8. The combination of a mold having a molding cavity, a thread former and hole formers projecting into the molding cavity, the hole formers consisting of tapering pins around which the glass is molded.

9. The combination of a mold having a molding cavity, a thread former and hole formers extending into the cavity through one face thereof, the opposite face of the cavity being closed save for molten-glass-entering passages, and means for withdrawing the formers from the molding cavity.

10. The combination of a mold partitioned horizontally to provide a plunger cavity and a molding cavity with the molten glass passages through the partition separating said cavities, the molding cavity being open from below, a thread former projecting upwardly into the molding cavity and stopping short of said partition, hole formers projecting into said cavity above the thread former and reaching to said partition, and means for withdrawing the thread and hole formers.

11. The combination of a mold base having a vertical passage, a hollow former threaded into said passage and at its upper end adapted to project above the mold base and at said end provided with exterior threads, a sectional mold having a molding cavity adapted to close over the mold base with the hollow former projecting thereinto, a gear wheel at the lower end of the hollow former, a rack bar engaging the gear wheel, hole formers projecting into the molding cavity above the hollow former, and a support for the hole formers extending through the said hollow former.

In testimony whereof I affix my signature in presence of two witnesses.

PHILLIP EBELING.

Witnesses:
C. B. ROE,
E. B. GRANDSTAFF.